(12) United States Patent
Conner et al.

(10) Patent No.: US 10,526,763 B2
(45) Date of Patent: Jan. 7, 2020

(54) STRUCTURAL FOUNDATION MONITORING SENSOR SYSTEM

(71) Applicant: Aquadation LLC, Austin, TX (US)

(72) Inventors: James Calvin Conner, Austin, TX (US); Christopher Scott Copeland, Austin, TX (US); Omar Besim Hakim, Austin, TX (US); DeWayne Ernest Krawl, Austin, TX (US)

(73) Assignee: Aquadation LLC, Austin, TX (US)

( * ) Notice: Subject to any disclaimer, the term of this patent is extended or adjusted under 35 U.S.C. 154(b) by 0 days.

(21) Appl. No.: 15/161,041

(22) Filed: May 20, 2016

(65) Prior Publication Data

US 2016/0340856 A1    Nov. 24, 2016

Related U.S. Application Data

(60) Provisional application No. 62/164,662, filed on May 21, 2015.

(51) Int. Cl.
*E02D 31/10* (2006.01)
*E02D 27/01* (2006.01)
(Continued)

(52) U.S. Cl.
CPC ............ *E02D 31/10* (2013.01); *E02D 27/01* (2013.01); *E02D 27/12* (2013.01); *E02D 27/34* (2013.01);
(Continued)

(58) Field of Classification Search
CPC ............ B65D 2590/0083; B65D 88/34; B65D 90/00; H04Q 2209/30; H04Q 2209/40;
(Continued)

(56) References Cited

U.S. PATENT DOCUMENTS 3,791,043 A * 2/1974 Russell ................. E21B 47/022
33/312
4,549,277 A * 10/1985 Brunson ................... G01C 9/06
33/366.12

(Continued)

FOREIGN PATENT DOCUMENTS

DE      102010047831      4/2012
EP      1956147           8/2008
(Continued)

OTHER PUBLICATIONS

International Search Report and Written Opinion from PCT/US2016/033668, dated Sep. 27, 2016, Aquadation LLC, pp. 1-14.
(Continued)

*Primary Examiner* — Emily C Terrell
(74) *Attorney, Agent, or Firm* — Robert C. Kowert; Kowert, Hood, Munyon, Rankin & Goetzel, P.C.

(57) ABSTRACT

Various embodiments of methods and apparatus for detecting a change in an orientation of a portion of a structure. In some embodiments, the apparatus includes a processor, an energy storage unit, a location reporting unit, a wireless communication module and one or more inclination sensors. In some embodiments, each of the one or more inclination sensors is configured to measure inclination by measuring an orientation of the each of the one or more inclination sensors relative to a gravitational acceleration vector.

21 Claims, 10 Drawing Sheets

(51) Int. Cl.
    *E02D 31/06*     (2006.01)
    *G01C 9/02*     (2006.01)
    *E02D 27/12*     (2006.01)
    *E02D 27/34*     (2006.01)
    *G01C 9/04*     (2006.01)

(52) U.S. Cl.
    CPC ............... *E02D 31/06* (2013.01); *G01C 9/02* (2013.01); *G01C 9/04* (2013.01)

(58) Field of Classification Search
    CPC . H04Q 2209/75; H04Q 2209/886; H04Q 9/00
    USPC ................................................ 340/539.24
    See application file for complete search history.

(56) References Cited

U.S. PATENT DOCUMENTS

| | | | | |
|---|---|---|---|---|
| 5,156,494 | A * | 10/1992 | Owens | E02D 31/10 |
| | | | | 340/690 |
| 6,338,013 | B1 * | 1/2002 | Ruffner | A01B 69/008 |
| | | | | 180/167 |
| 8,577,628 | B2 * | 11/2013 | Caicedo | G01V 1/003 |
| | | | | 702/183 |
| 9,267,862 | B1 * | 2/2016 | Kavars | G01M 5/0008 |
| 2003/0210140 | A1 * | 11/2003 | Menard | E03D 7/02 |
| | | | | 340/531 |
| 2006/0021235 | A1 * | 2/2006 | Becker | G01C 1/00 |
| | | | | 33/282 |
| 2008/0061959 | A1 * | 3/2008 | Breed | B60C 11/24 |
| | | | | 340/539.1 |
| 2008/0262646 | A1 * | 10/2008 | Breed | G01F 23/20 |
| | | | | 700/226 |
| 2010/0031522 | A1 * | 2/2010 | Ammann | G01C 9/32 |
| | | | | 33/366.16 |
| 2010/0238027 | A1 * | 9/2010 | Bastianini | G01D 9/005 |
| | | | | 340/540 |
| 2011/0063107 | A1 * | 3/2011 | Tzonev | B65D 90/00 |
| | | | | 340/539.24 |
| 2011/0174399 | A1 * | 7/2011 | Tzonev | H04Q 9/00 |
| | | | | 137/553 |
| 2011/0202289 | A1 * | 8/2011 | Kalantari Khandani | G01M 5/0008 |
| | | | | 702/42 |
| 2013/0120155 | A1 * | 5/2013 | Hagg | G01F 23/00 |
| | | | | 340/870.01 |
| 2013/0278377 | A1 | 10/2013 | Slupsky et al. | |
| 2014/0190255 | A1 | 7/2014 | Larigani | |
| 2014/0310967 | A1 | 10/2014 | Nagornov | |
| 2017/0363503 | A1 * | 12/2017 | Tothill | E01D 15/12 |

FOREIGN PATENT DOCUMENTS

EP           20147592         1/2010
WO         2009121169      10/2009

OTHER PUBLICATIONS

European Search report and Written Opinion from PCT/US2016033668, dated Jan. 24, 2019, Aquadation LLC, pp. 1-11.

\* cited by examiner

STRUCTURAL FOUNDATION MONITORING SENSOR SYSTEM

PRIORITY INFORMATION

This application claims benefit of priority of U.S. Provisional Application Ser. No. 62/164,662 entitled "Systems, Methods and Apparatus for Monitoring Structural Foundations, Alerting of Potential Failures or Damage and Controlling an Irrigation System" filed May 21, 2015, the content of which is incorporated by reference herein in its entirety.

BACKGROUND

Description of the Related Art

A foundation (or, more commonly, foundations) form the lowest part of an architectural structure and are generally either shallow or deep. They and their construction are also sometimes called basework, especially in the context of larger structures.

Shallow foundations, often called footings, are usually embedded about a meter or so into soil. One common type is the spread footing which consists of strips or pads of concrete (or other materials) which extend below the frost line and transfer the weight from walls and columns to the soil or bedrock. A shallow foundation is a type of foundation which transfers building loads to the earth very near the surface, rather than to a subsurface layer or a range of depths as does a deep foundation. Shallow foundations include spread footing foundations, mat-slab foundations, slab-on-grade foundations, pad foundations, rubble trench foundations and earthbag foundations.

Another common type of shallow foundation is the slab-on-grade foundation where the weight of the building is transferred to the soil through a concrete slab placed at the surface. Slab-on-grade foundations can be reinforced mat slabs, which range from 25 cm to several meters thick, depending on the size of the building, or post-tensioned slabs, which are typically at least 20 cm for houses, and thicker for heavier structures.

Slab-on-grade or floating slab foundations are a structural engineering practice, whereby the concrete slab that is to serve as the foundation for the structure is formed from a mold set into the ground. The concrete is then placed into the mold, leaving no space between the ground and the structure. This type of construction is most often seen in warmer climates, where ground freezing and thawing is less of a concern and where there is no need for heat ducting underneath the floor. The advantages of the slab technique are that it is cheap and sturdy, and is considered less vulnerable to termite infestation because there are no hollow spaces or wood channels leading from the ground to the structure (assuming wood siding, etc., is not carried all the way to the ground on the outer walls).

A deep foundation is used to transfer the load of a structure down through the upper weak layer of topsoil to the stronger layer of subsoil below. There are different types of deep footings including impact driven piles, drilled shafts, caissons, helical piles, geo-piers and earth stabilized columns. The naming conventions for different types of footings vary between different engineers. Historically, piles were wood, later steel, reinforced concrete, and pre-tensioned concrete.

A monopile foundation is a type of deep foundation which uses a single, generally large-diameter, structural element embedded into the earth to support all the loads (weight, wind, etc.) of a large above-surface structure.

As used herein, the term foundation refers any type of load bearing architectural structure, including but not limited to footings, concrete slabs, concrete slab-on-grade, impact driven piles, drilled shafts, caissons, helical piles, geo-piers and earth stabilized columns.

Foundations are designed to have an adequate load capacity with limited settlement by a geotechnical engineer, and the footing itself may be designed structurally by a structural engineer.

The primary design concerns are settlement and bearing capacity. When considering settlement, total settlement and differential settlement is normally considered. Differential settlement is when one part of a foundation settles more than another part. This can cause problems to the structure, which the foundation is supporting.

A concrete slab foundation is a common structural element of modern buildings. Horizontal slabs of steel reinforced concrete, typically between 4 and 20 inches (100 and 500 millimeters) thick, are most often used to construct floors and ceilings, while thinner slabs are also used for exterior paving. Sometimes these thinner slabs, ranging from 2 inches (5.1 cm) to 6 inches (15 cm) thick, are called mud slabs, particularly when used under the main floor slabs or in crawl spaces.

In many domestic and industrial buildings a thick concrete slab, supported on foundations or directly on the subsoil, is used to construct the ground floor of a building. These can either be "ground-bearing" or "suspended" slabs. In high rise buildings and skyscrapers, thinner, pre-cast concrete slabs are slung between the steel frames to form the floors and ceilings on each level. On the technical drawings, reinforced concrete slabs are often abbreviated to "r.c.slab" or simply "r.c.".

SUMMARY

Various embodiments of methods and apparatus detecting a change in an orientation of a portion of a structure. In some embodiments, the apparatus includes a processor, an energy storage unit, a location reporting unit, a wireless communication module and one or more inclination sensors. In some embodiments, each of the one or more inclination sensors is configured to measure inclination by measuring an orientation of the each of the one or more inclination sensors relative to a gravitational acceleration vector.

Figure 1:
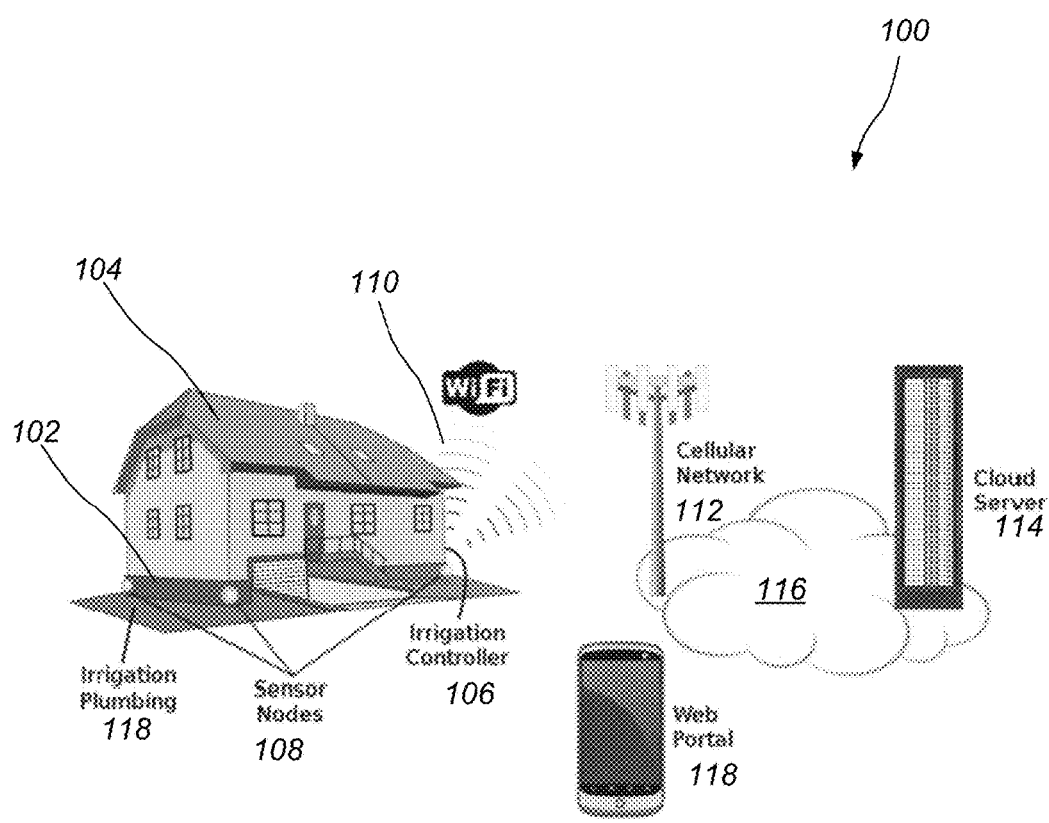
FIG. 1 illustrates a system for monitoring structural foundations, alerting of potential failures or damage and controlling an irrigation system, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for detecting a change in an orientation of a portion of a structure. In some embodiments, the apparatus includes a processor, an energy storage unit, a location reporting unit, a wireless communication module and one or more inclination sensors. In some embodiments, each of the one or more inclination sensors is configured to measure inclination by measuring an orientation of the each of the one or more inclination sensors relative to a gravitational acceleration vector.

In some embodiments, the one or more inclination sensors further include a plurality of accelerometers, the structure is stationary with regard to location, and the apparatus is rigidly attached to a fixed portion of the structure.

In some embodiments, the processor is configured to periodically activate the wireless communication unit at intervals such that the inclination sensors remain powered less than 2.0% of a period that the apparatus is in use.

In some embodiments, the processor is configured to periodically activate the inclination sensors at intervals such that the inclination sensors remain powered less than 0.2% (2 tenths of one percent or 2 1000ths of a period that the apparatus is in use).

In some embodiments, the processor is configured to periodically activate the inclination sensors at intervals such that the inclination sensors remain powered less than 0.2% (2 tenths of one percent) or 2 1000ths of a period that the apparatus is in use.

In some embodiments, the energy storage unit includes a solar cell array and one or more capacitors connected to the solar cell array for storing power received from the solar cell array and delivering power to one or more components of the apparatus.

In some embodiments, a temperature sensor is included for recording a temperature adjacent to the plurality of inclination sensors, for example, within the space less than three feet from the sensors. In some embodiments, a precipitation sensor is included for recording rainfall adjacent to the plurality of inclination sensors Some embodiments include a method for detecting a change in an orientation of a portion of a structure. In some embodiments, the method includes measuring inclination by measuring an orientation of each of one or more inclination sensors relative to a gravitational acceleration vector, and reporting the respective orientations of the each of the one or more inclination sensors relative to the gravitational acceleration vector.

In some embodiments, the method further includes deactivating the inclination sensors at intervals such that the inclination sensors remain powered less than 0.2% (2 tenths of one percent) or 2 1000ths of a period that an apparatus including the sensors is in use.

In some embodiments, the reporting further includes attempting to report the respective orientations of the each of the one or more inclination sensors to a local master control unit by radio, responsive to the inability to report the respective orientations of the each of the one or more inclination sensors to the local master control unit over a short-range wireless network, attempting to report the respective orientations of the each of the one or more inclination sensors to a local peer sensor unit, and responsive to the inability to report the respective orientations of the each of the one or more inclination sensors to the peer sensor unit, storing and queuing the respective orientations of the each of the one or more inclination sensors for communication in a subsequent attempt at a subsequent reporting interval.

In some embodiments, the method further includes reporting location information of the one or more inclination sensors.

In some embodiments, the method further includes reporting location information of the one or more inclination sensors, wherein the reporting location information includes reporting a coordinate location on a fixed structure.

In some embodiments, the method further includes reporting location information of the one or more inclination sensors, wherein the reporting location information includes reporting a GPS coordinate location.

In some embodiments, the method further includes reporting location information of the one or more inclination sensors, wherein the reporting location information includes reporting a device identifier.

In some embodiments, the method further includes recording a temperature adjacent to the plurality of inclination sensors, and reporting the temperature adjacent to the plurality of inclination sensors.

In some embodiments, a system for monitoring structural foundations, alerting of potential failures or damage and controlling an irrigation system includes one or more sensor units configured to perform measuring inclination by measuring an orientation of each of one or more inclination sensors relative to a gravitational acceleration vector, and reporting the respective orientations of the each of the one or more inclination sensors relative to the gravitational acceleration vector. In some embodiments, the system further includes a data aggregator configured to perform reporting data received from the one or more sensor units to a remote data repository.

In some embodiments, the system further includes an irrigation controller for controlling application of water to a foundation of a structure based upon commands received from a remote command authority.

In some embodiments, the controlling application of water to a foundation of a structure based upon commands received from a remote command authority further includes controlling application of respective specified amounts of water to each of one or more specified irrigation zones adjacent to the foundation of the structure based upon the commands received from the remote command authority.

In some embodiments, the system further includes a remote processing system configured to perform receiving data from the one or more irrigation controllers, determining, based at least in part upon the data, respective specified amounts of water for each of one or more specified irrigation zones adjacent to the foundation of the structure, and generating irrigation controller commands for the controlling the application of the respective specified amounts of water to the each of the one or more specified irrigation zones adjacent to the foundation of the structure.

In some embodiments, the determining, based at least in part upon the data, respective specified amounts of water for each of one or more specified irrigation zones adjacent to the foundation of the structure further includes determining, based at least in part upon the data and a foundation topography survey, respective specified amounts of water for each of one or more specified irrigation zones adjacent to the foundation of the structure.

In some embodiments, the determining, based at least in part upon the data, respective specified amounts of water for each of one or more specified irrigation zones adjacent to the foundation of the structure further includes determining, based at least in part upon the data, historical feedback information related to results of previous commands, respective specified amounts of water for each of one or more specified irrigation zones adjacent to the foundation of the structure.

The modules described herein may, in some embodiments, be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform one or more steps of the processes and techniques described herein. Other embodiments may be at least partially implemented by hardware circuitry and/or firmware stored, for example, in a non-volatile memory.

Example Implementations

FIG. 1 illustrates a system for monitoring structural foundations, alerting of potential failures or damage and controlling an irrigation system, according to some embodiments. In a typical installation, sensor nodes are placed in all four corners of the slab to periodically measure the tilt angle with accelerometers and report the data through a cellular uplink or WiFi network to the cloud server. The cloud server stores and analyzes the incoming data from the sensor nodes and instructs the irrigation controller to apply water to areas around the slab that need corrective action. Users may also access and visualize the data via a web portal.

In some embodiments, a system 100 for monitoring structural foundations 102, such as that of example structure 104, alerting of potential failures or damage and controlling an irrigation system, for example through irrigation controller 106, includes one or more sensor units (nodes 108) configured to perform measuring inclination by measuring an orientation of each of one or more inclination sensors relative to a gravitational acceleration vector, and reporting the respective orientations of the each of the one or more inclination sensors relative to the gravitational acceleration vector. In some embodiments, the system further includes a data aggregator configured (in some embodiments, integrated with irrigation controller 106) to perform reporting (e.g., over cellular network 112 data received (e.g., via WiFi 110) from the one or more sensor units 108 to a remote data repository, such as cloud server 114 on network 116.

In some embodiments, the system further includes an irrigation controller 106 for controlling application of water through irrigation plumbing 118 to a foundation of a structure based upon commands received from a remote command authority, which can be embodied in cloud server 114 or web portal 120. Irrigation controller 106 connects to irrigation plumbing 118. In some embodiments, the irrigation plumbing 118 consists of off-the-shelf irrigation valves, piping, and drip irrigation lines buried around the perimeter of the slab. The irrigation valves connect back to the irrigation controller through typical direct burial wire with a single common connection infrastructure.

In some embodiments, irrigation plumbing 118 includes microdrip irrigation tubing, such as that offered by rainbird, that provides 0.9 gallons per hour drip per emitter, at 1 emitter per foot of irrigation plumbing. With known emitters per zone of irrigation plumbing 118. In some embodiments, irrigation plumbing 118 may be structured around zones of ten feet long with ten emitters.

In some embodiments, web portal 120 is used for installation of the system and to manage each installation over its lifetime.

In some embodiments, the controlling application of water to a foundation of a structure based upon commands received from a remote command authority further includes controlling application of respective specified amounts of water through irrigation plumbing 118 to each of one or more specified irrigation zones adjacent to the foundation 102 of the structure 104 based upon the commands received from the remote command authority 114.

In some embodiments, sensor nodes 108 measure the relative tilt at the corners of the foundation and relay their measurements to the irrigation controller 106 via a low speed ISM band radio link. Sensor nodes periodically wake up, take a tilt reading with the accelerometer, transmit that reading to the irrigation controller 106, and go back to sleep. If communication with the irrigation controller 106 is not successful, then the sensor node 108 will cache the reading and attempt to retransmit it during the next reading interval.

In some embodiments, the system further includes a remote processing system 114 configured to perform receiving data from the one or more irrigation controllers 106, determining, based at least in part upon the data, respective specified amounts of water for each of one or more specified irrigation zones adjacent to the foundation 102 of the structure 104, and generating irrigation controller 106 commands for the controlling the application of the respective specified amounts of water to the each of the one or more specified irrigation zones adjacent to the foundation 102 of the structure 104.

In some embodiments, the determining, based at least in part upon the data, respective specified amounts of water for each of one or more specified irrigation zones adjacent to the foundation 102 of the structure 104 further includes determining, based at least in part upon the data and a foundation 102 topography survey, respective specified amounts of water for each of one or more specified irrigation zones adjacent to the foundation 102 of the structure 104.

In some embodiments, the determining, based at least in part upon the data, respective specified amounts of water for each of one or more specified irrigation zones adjacent to the foundation 102 of the structure 104 further includes determining, based at least in part upon the data, historical feedback information related to results of previous commands, respective specified amounts of water for each of one or more specified irrigation zones adjacent to the foundation 102 of the structure 104.

Figure 2:
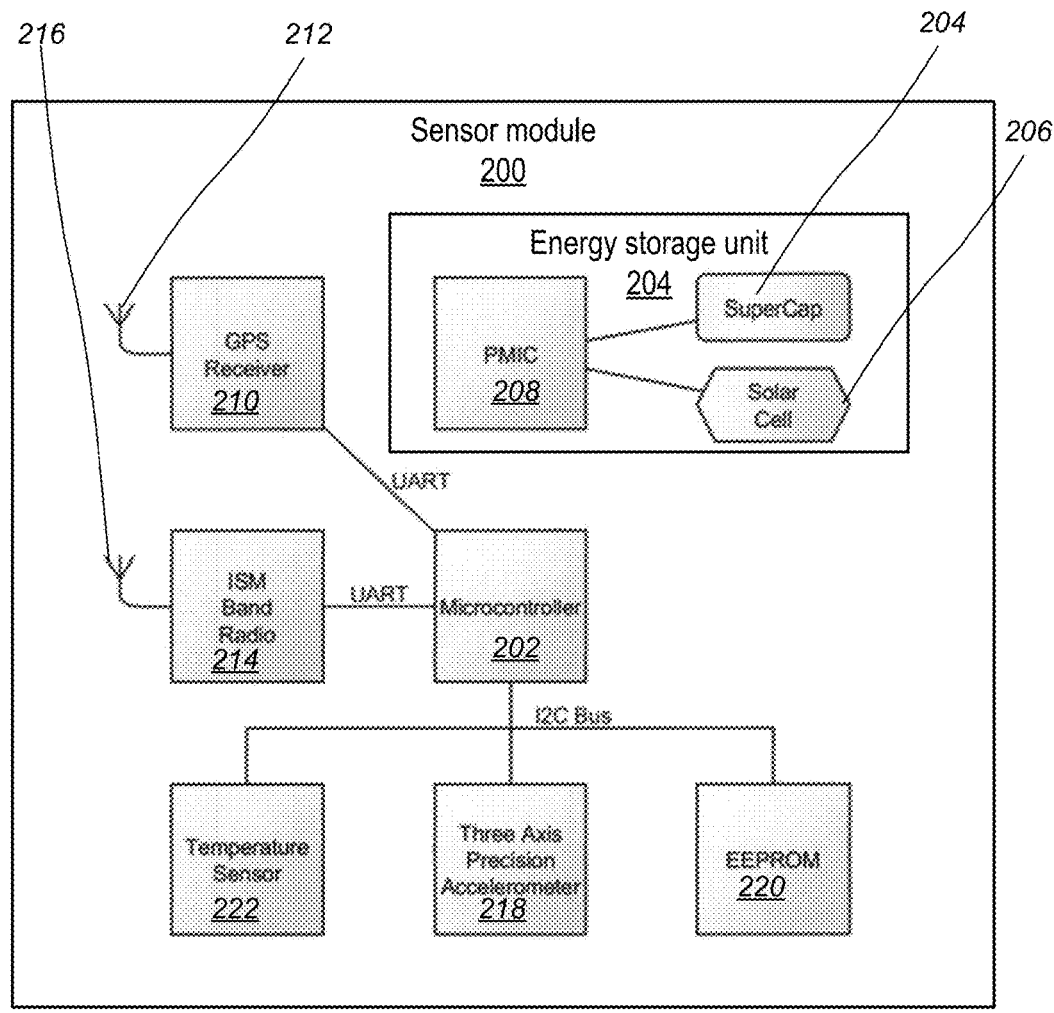
FIG. 2 depicts a sensor module for monitoring structural foundations, according to some embodiments.

FIG. 2 depicts a sensor unit for monitoring structural foundations, according to some embodiments. The apparatus includes a processor (microcontroller 202), an energy storage unit 204 (including a power management integrated circuit 208, a supercapacitor 204 and a solar cell 206), a location reporting unit (e.g., GPS receiver 210 with antenna 212), a wireless communication module (e.g., ISM band radio 214 with antenna 216 and one or more inclination sensors.

In some embodiments microcontroller 202 directs all operations within the sensor node, three axis accelerometer 218 is used to read the tilt in the slab (triple redundant).

A temperature sensor 222 reads the ambient temperature of the node to compensate for temperature dependent error in the accelerometer and for general environmental monitoring.

In some embodiments, EEPROM 220 stores configuration parameters such as what irrigation controller the sensor node 200 is associated to and is used as a temporary data cache in the face of wireless communication failures. ISM band radio 214 provides wireless communication between the sensor nodes. GPS receiver 210 locates the position of the sensor on the building. Solar cells 206 serve as a power source for the sensor nodes. Super capacitor 204 serves as a power reservoir for collecting energy from the solar cells. A power management IC (PMIC} 208 boosts the voltage from the solar cells to a regulated level for the system and charges the super capacitor.

In some embodiments, each of the one or more inclination sensors is configured to measure inclination by measuring an orientation of the each of the one or more inclination sensors, such as three-axis precision accelerometer 218, relative to a gravitational acceleration vector.

In some embodiments, microcontroller 202, EEPROM 220, and temperature sensor 222 share an I2C bus 224.

In some embodiments, the one or more inclination sensors further include a plurality of accelerometers, such as three-axis precision accelerometer 218, the structure is stationary with regard to location, and the apparatus is rigidly attached to a fixed portion of the structure.

In some embodiments, the processor 202 is configured to periodically activate the wireless communication unit 214 at intervals such that the inclination sensors remain powered less than 2.0% of a period that the apparatus is in use.

In some embodiments, the processor 202 is configured to periodically activate the inclination sensors 218 at intervals such that the inclination sensors remain powered less than 0.2% (2 tenths of one percent or 2 1000ths of a period that the apparatus is in use).

In some embodiments, the processor 202 is configured to periodically activate the inclination sensors 218 at intervals such that the inclination sensors remain powered less than 0.2% (2 tenths of one percent) or 2 1000ths of a period that the apparatus is in use.

In some embodiments, the energy storage unit includes a solar cell array and one or more capacitors connected to the solar cell array for storing power received from the solar cell array and delivering power to one or more components of the apparatus.

Figure 3:
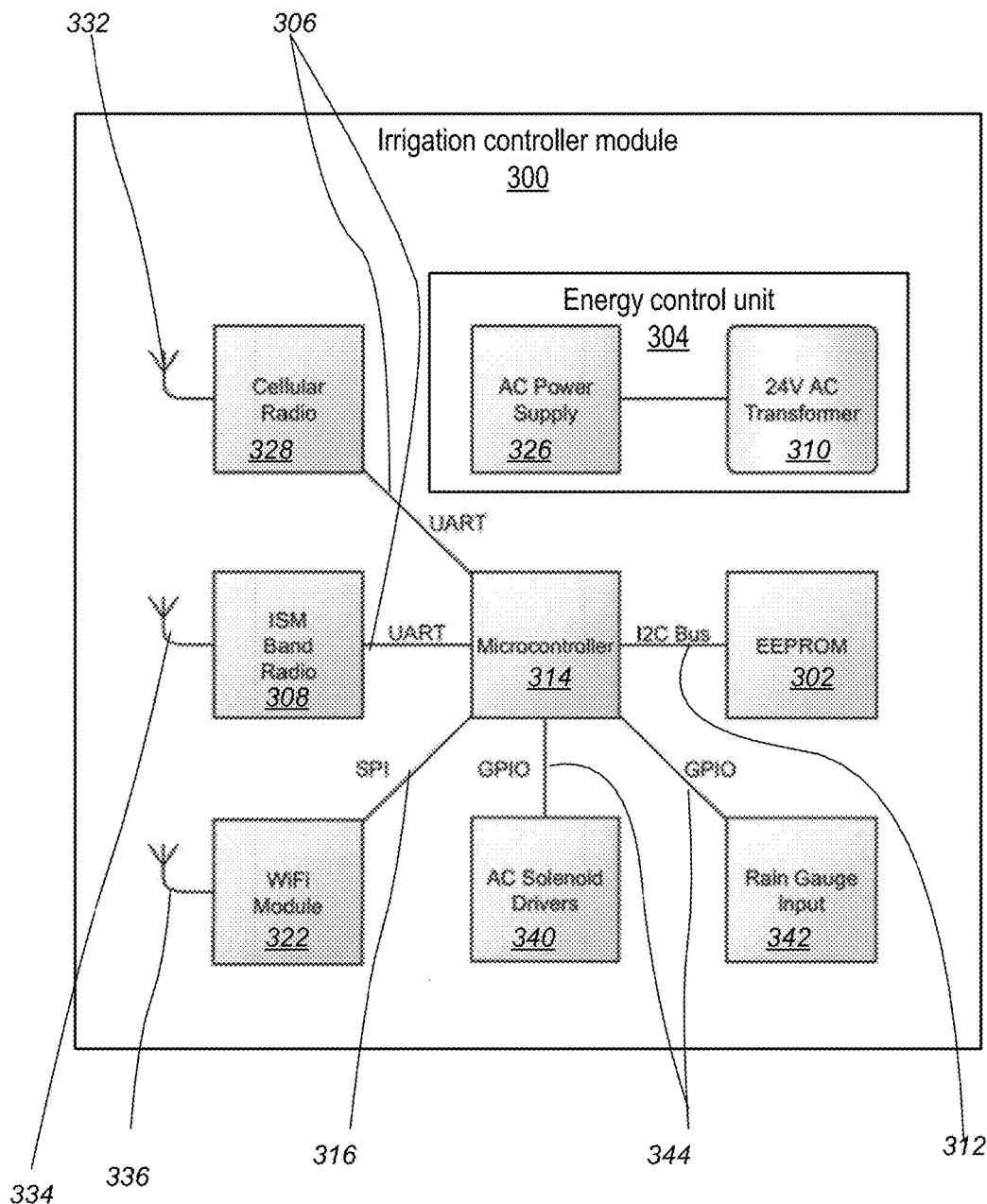
FIG. 3 illustrates an irrigation module for monitoring structural foundations, according to some embodiments.

In some embodiments, a temperature sensor 222 is included for recording a temperature adjacent to the plurality of inclination sensors 218 In some embodiments, a precipitation sensor (not shown) is included for recording rainfall adjacent to the plurality of inclination sensors FIG. 3 illustrates an irrigation module for monitoring structural foundations, according to some embodiments. Irrigation controller 300 includes a microcontroller 314 connected by an I2C bus 312 to an EEPROM 314. An energy control unit 304 includes an AC power supply 326 and a 24V AC Transformer 310. Microcontroller 314 connects over a UART interface 306 to a cellular radio 328 with an antenna 332, an ISM band radio 308 with an antenna 334. Microcontroller 314 connects over an SPI interface 316 to a WiFi module 322 with an antenna 336. Microcontroller 314 connects over a GPIO interface 344 to A/C solenoid drivers 340 for controlling water valves and a precipitation gauge 342 for receiving rainfall data.

Microcontroller 314 directs all operations within the irrigation controller. AC solenoid drivers 340 are drivers for the 24V AC solenoids in the irrigation valves. Rain gauge input 342 provides protected input to read an external rain gauge. EEPROM 302 Stores the irrigation schedule set by the cloud server and the communication parameters used by the WiFi. ISM Band Radio 308 provides wireless communication between the sensor nodes. Cellular radio 329 allows the irrigation controller to communicate with the cloud server over a 2G/3G cellular data network. WiFi Module 322 connects to the cloud server via the customer's WiFi network. AC Power Supply 326 converts the 24V AC power to the DC voltages needed by the system. 24V AC transformer 310 is an external 24V AC transformer.

In some embodiments, the presence of rain gauge input allows for a correlation mapping between a rain amount and a corresponding irrigation event per exposed zone, such that the machine learning treats the rain as though it was an intentional event and improves data integrity in the model, also allowing for soil plasticity calculations.

In some embodiments, irrigation control module 300 acts as the gateway for data coming up from sensors nodes and controls irrigation valves.

In some embodiments, irrigation control module 300 is the means by which to upgrade the firmware for the sensors, such as when the sensors have small radios in 900 MHz.

In some embodiments, irrigation control module 300 receives data from the rain sensors and passes it up to the control server, as well as providing valve-level connection to flow meter data.

In some embodiments, irrigation control module 300 uses AC solenoids because they default to closed.

In some embodiments, irrigation control module 300 is also controlling a master controller that also defaults to off.

Figure 4:
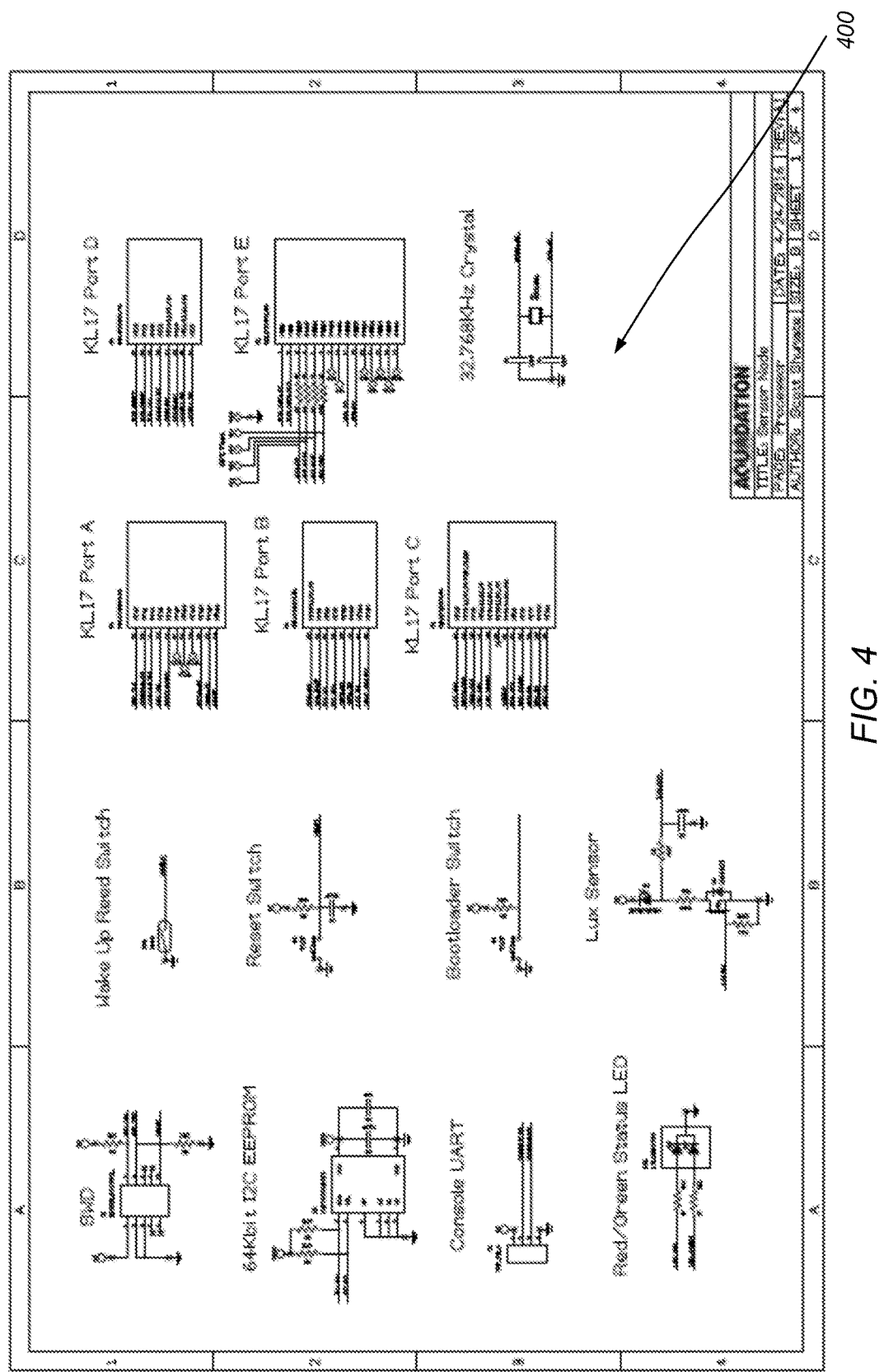
FIG. 4 depicts schematics of a sensor module for monitoring structural foundations, according to some embodiments.

FIG. 4 depicts schematics of a sensor module for monitoring structural foundations, according to some embodiments. Schematics 400 illustrate a potential hardware design providing details of FIG. 2.

Figure 5:
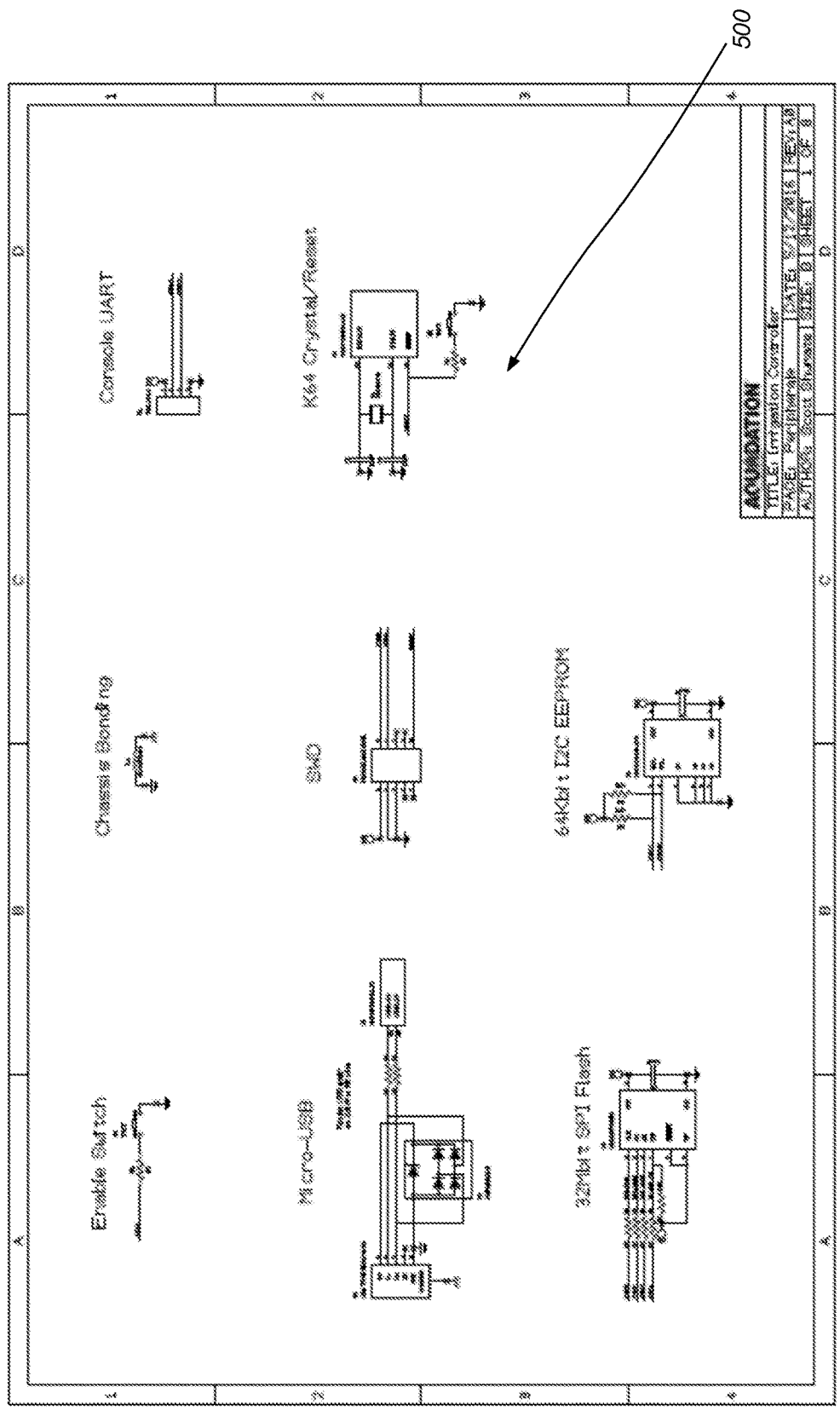
FIG. 5 illustrates schematics of an irrigation module for monitoring structural foundations, according to some embodiments.

FIG. 5 illustrates schematics of an irrigation module for monitoring structural foundations, according to some embodiments. Schematics 500 illustrate a potential hardware design providing details of FIG. 3.

Figure 6:
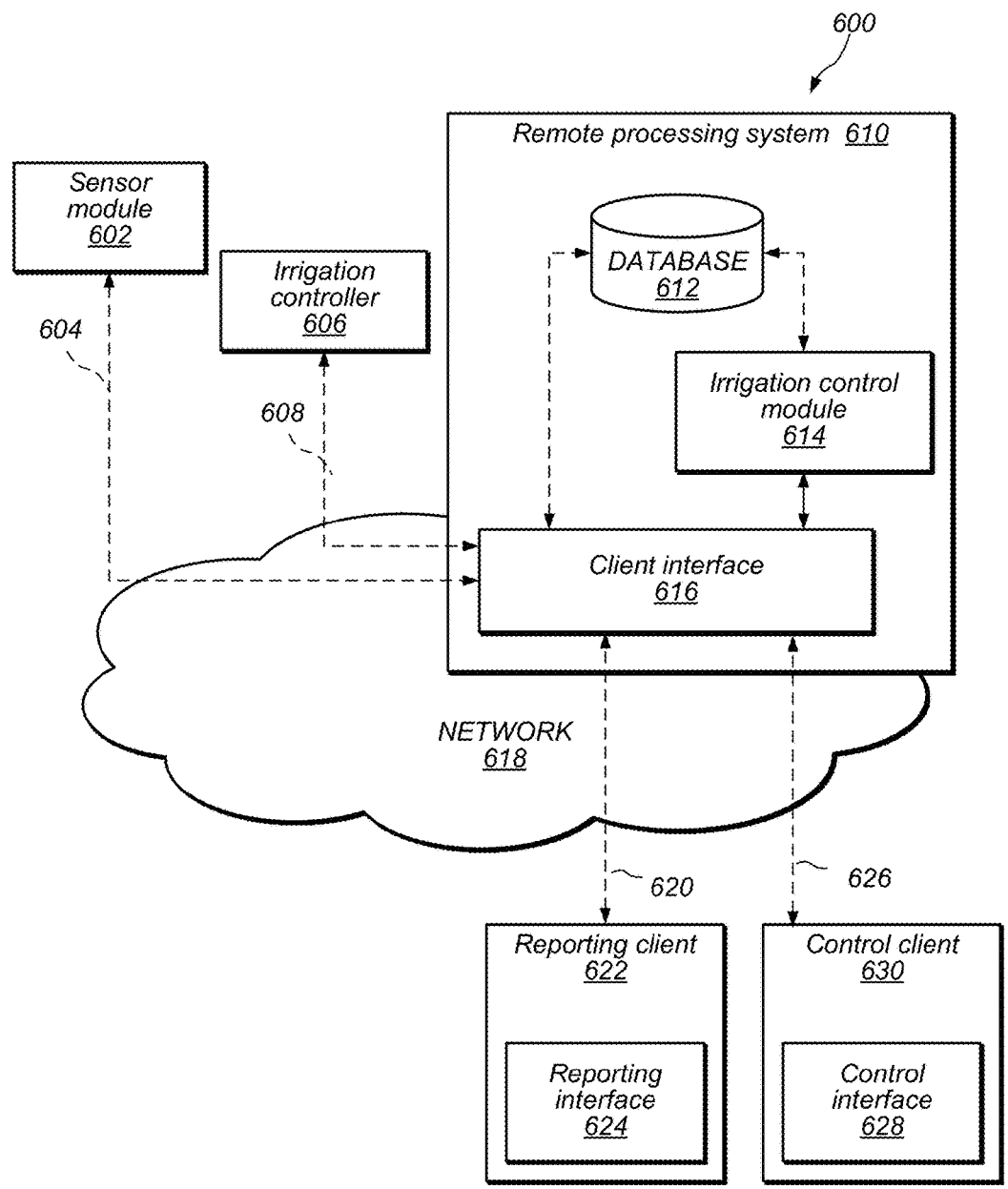
FIG. 6 depicts a system for monitoring structural foundations, alerting of potential failures or damage and controlling an irrigation system, according to some embodiments.

FIG. 6 depicts a system for monitoring structural foundations, alerting of potential failures or damage and controlling an irrigation system, according to some embodiments. System 600 includes sensor modules 602, an irrigation controller 606, a remote processing system 610, a reporting client 622 and a control client 626 communicating over a network 618 or networks or various communication links through a client interface 616.

Irrigation control module 614 controls various tools to sense and proactively correct problems with building foundations by monitoring changes in the tilt angle of a concrete slab and applying targeted irrigation to the slab to offset those changes.

Sensor nodes such as sensor module 602 measure the relative tilt at the corners of the foundation and relay their measurements to the irrigation controller 606 via a low speed ISM band radio link. Sensor nodes 602 periodically wake up, take a tilt reading with the accelerometer, transmit that reading to the irrigation controller, and go back to sleep. If communication with the irrigation controller is not successful, then the sensor node will cache the reading and attempt to retransmit it during the next reading interval.

In some embodiments, irrigation control system controls the flow of water at valves controlled by irrigation controller 606 into drip line pipes to expand the soil under several irrigation zones to lift portions of the foundation of the structure. In some embodiments, irrigation controller 606 can be replaced with other methods for raising a foundation such as:

water bags buried in multiple zones under the foundation
air bags buried in multiple zones under the foundation
pneumatics buried in multiple zones under the foundation
hydraulics buried in multiple zones under the foundation
"screw lifts" buried in multiple zones under the foundation (using threaded piers)
"ratcheted jacks" buried in multiple zones under the foundation Remote processing system 610 includes a database 612, an irrigation control module 614 and client interface 616. Remote processing system 610 (also called "cloud server") receives sensor readings from a large number of irrigation controllers 606 and saves them into a database 612. The cloud server 610 also periodically analyzes the data to determine if it needs to send any commands to any irrigation controllers 606 to alter the irrigation schedule, providing sensor data and irrigation schedule control as an application program interface (API) on the cloud server. The analysis of sensor data and feedback to the irrigation schedules may be performed on cloud server 610.

In some embodiments, cloud server 610 includes user authentication and is able to associate nodes 602 to user accounts. This is a one-to-many association to allow many combinations of contractors, warranty companies or building owners to access the node. In some embodiments, each association has a permission level that specifies what activities a user is allowed to do with each node. Users are able to set up different notifications for the same node through control client 630 using a control interface 628, such as a web portal. A user with an administrative permission level is allowed to add or remove nodes 602 from the server. In some embodiments, instructions from irrigation control module 614 to irrigation controller 606 describe flow time on the valve. Alternatively, instructions from irrigation control module 614 to irrigation controller 606 describe volume and can be configured with a different number of emitters per zone to facilitate leak detection, such that if the flow meter does not match the time on the valves, a failed valve is detected.

In some embodiments, sensor module 602 has two modes. One mode operates as part of the overall irrigation system. Such a mode captures data and passes it to the irrigation controller 606.

In some embodiments, sensor module 602 operates in a storage mode, storing data without contact with irrigation controller 606 and capturing 1-3 years worth of daily readings. In some embodiments, sensor module 602 can be awakened from a handheld terminal by a service technician, who can take the data to a portable computer.

In some embodiments, the irrigation controller 606 has two primary functions. The first is to receive readings from the sensor nodes 602 over the ISM band radio connection and relay them to the cloud server 610 using either the cellular radio uplink or the WiFi network.

In some embodiments, the second function is to irrigate the zones around the perimeter of the slab based on a schedule calculated by the cloud server 610. The irrigation controller is designed to facilitate installation by irrigation contractors and it utilizes the same power supply, zone wiring, irrigation valves, and rain gauges as typical lawn irrigation systems.

Reporting client 622 includes a reporting interface 624, such as a web portal. Control client 630 includes a control interface 628, such as a web portal. In some embodiments, sensor modules 602 and irrigation controller 606 deploy a mesh network for communication between themselves. In some embodiments, sensor modules 602 and irrigation controller 606 integrate with home automation systems, such as those offered by Nest or the Apple Homekit.

In some embodiments, sensor modules 602 and irrigation controller 606 are packed in watertight housings. In some embodiments, sensor modules 602 are equipped with GPS and an accelerometer for use as a gravity sensor, and they can sync to time from. In some embodiments, sensor modules 602 derive light information from their solar panels. In some embodiments, sensor modules 602 have power management circuits and perform capacitor health management. In some embodiments, sensor modules 602, if light and capacitor performance deteriorate in parallel, sensor modules 602 may have detected an obstruction of the solar panels. In some embodiments, sensor modules 602 may detect that a capacitor dies with a good solar system, indicating failed capacitors.

In some embodiments, sensor modules 602 and irrigation controller 606 employ diagnostics on the health of the wireless connections.

In some embodiments, sensor modules 602 and irrigation controller 606 employ a proprietary encrypted mesh protocol. In some embodiments, sensor modules 602 and irrigation controller 606 employ off the shelf communication protocols. In some embodiments, sensor modules 602 and irrigation controller 606 employ encryption at one or more of link and data levels.

Figure 7:
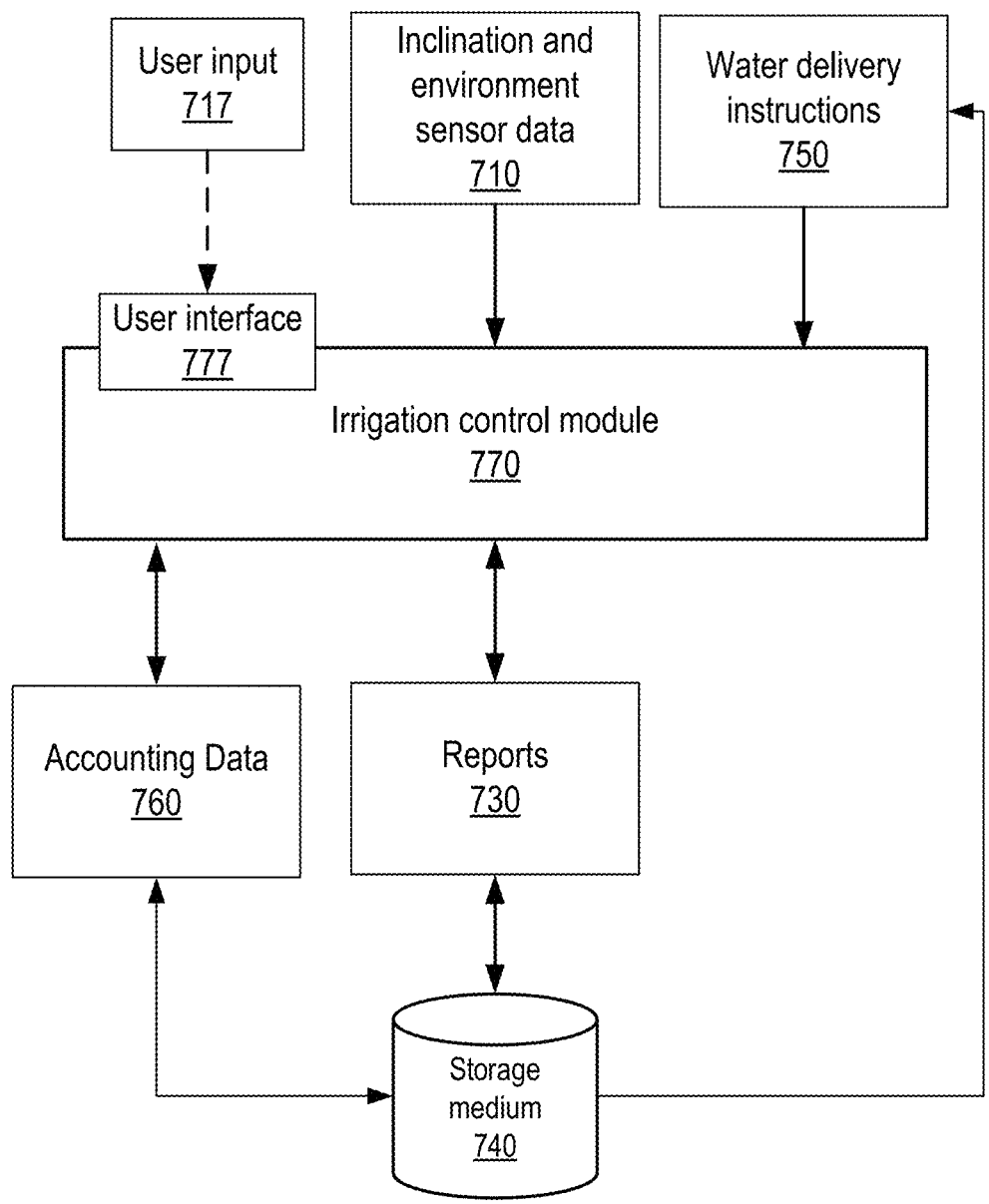
FIG. 7 depicts a module for monitoring structural foundations, alerting of potential failures or damage and controlling an irrigation system, according to some embodiments.

FIG. 7 depicts a module for monitoring structural foundations, alerting of potential failures or damage and controlling an irrigation system, according to some embodiments.

FIG. 7 illustrates an irrigation control module that may implement one or more of the techniques and tools illustrated in FIGS. 1-9. Module 770 may, for example, implement one or more of monitoring structural foundations, alerting of potential failures or damage and controlling an irrigation system. FIG. 10 illustrates an example computer system on which embodiments of module 770 may be implemented. Module 770 receives as input one or more items of inclination and environment sensor data 710. Module 770 may receive user input 717 activating a tool for monitoring structural foundations, alerting of potential failures or damage and controlling an irrigation system. Module 770 then generates water delivery instructions 750 as output, which may, for example, be stored to a storage medium 740, such as system memory, a disk drive, DVD, CD, etc.

In some embodiments, module 770 may provide a user interface 777 via which a user may interact with the module 770, such as a web portal, reporting interface, or control interface, for example to activate a tool for monitoring structural foundations, alerting of potential failures or damage and controlling an irrigation system as described herein. In some embodiments, the user interface may provide user interface elements whereby the user may select options and provide direct commands for foundation repairs based on data 710. Instructions 750, as well as accounting data 760 and reports 730, may be generated via a machine learning system.

Figure 8:
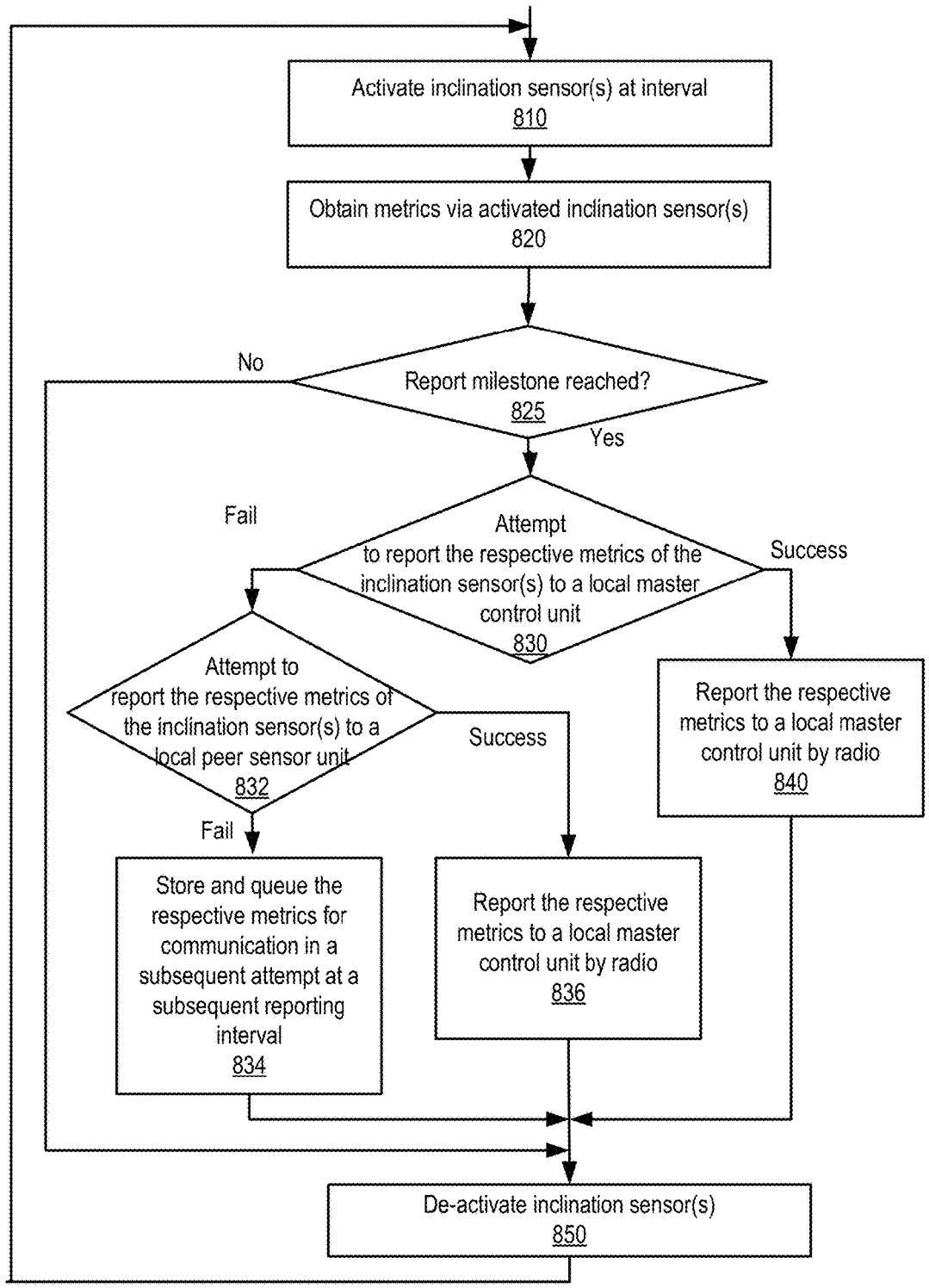
FIG. 8 are flowcharts of methods for monitoring structural foundations, alerting of potential failures or damage and controlling an irrigation system, according to some embodiments.

FIG. 8 is flowchart of methods for monitoring structural foundations, alerting of potential failures or damage and controlling an irrigation system, according to some embodiments. FIG. 8 is a flow chart that illustrates a process for sensors to obtain and report data. In some embodiments, the sensors (e.g., inclination sensors, or other sensors) may be activated at an interval (block 810). For instance, the sensors may activate (or be activated) at intervals such that the sensors remain powered less than a period that the apparatus the sensor is a part of is in use (e.g., less than 0.2% (2 tenths of one percent) or 2 1000ths of a period that an apparatus including the sensors is in use). In some embodiments, the sensors may be de-activated at intervals such that the inclination sensors remain powered less than a period that the apparatus is in use (e.g., less than 0.2% (2 tenths of one percent) or 2 1000ths of a period that an apparatus including the sensors is in use).

Various metrics or measurements may be obtained by the activated sensors (block 820). For instance, inclination measurements may be obtained by measuring an orientation of each of one or more inclination sensors relative to a gravitational acceleration vector. In some embodiments, temperature may be obtained. For example, a temperature adjacent to the sensor may be recorded by the sensor. Other metrics may be obtained without departing from the scope of the invention. For example, the location information of the sensor (e.g., a coordinate location on a fixed structure, a GPS coordinate location, a device identifier, etc.).

In embodiments, a determination of a milestone for reporting may be determined (block 825). For instance, the milestone may be reached when a number of metrics have been obtained (e.g., because a memory is getting full, or because regular reporting is desired), when a time period has elapsed (e.g., because an analysis tool needs regular data), or otherwise. If it is determined that the milestone has not been reached, the process may continue to block 850 where the sensors are de-activated (e.g., for a period or until activated). If it is determined that a reporting milestone has been reached, the sensor may make an attempt to report the metrics (e.g., the inclination measurements obtained by measuring an orientation of each of one or more inclination sensors relative to a gravitational acceleration vector, the temperature adjacent to the sensor, the location information of the sensor, etc.) to a local master control unit by radio (block 830). If successful (e.g., if the sensor is able to establish a communication channel with the local master control unit), the sensor may report the respective metrics to a local master control unit by radio (block 840).

However, if the attempt to report to the local master control unit fails (e.g., if communication cannot be established over a short-range wireless network) the sensor may attempt to report the respective metrics of the inclination sensor to a local peer sensor unit (block 832). If the attempt is successful (e.g., if a communication channel is established with the local peer sensor unit) the sensor that obtained the data may report the respective metrics to a local master control unit by radio (block 836). In embodiments, this passing of the data to a neighboring sensor may be repeated until the data reaches a desired destination, such as the local master control unit, or another control unit further up a hierarchy of control units, for instance. In some embodiments, instead of being a back-up system of reporting data, this sensor-jumping scheme may be the primary scheme for moving the data from remote sensors to a control unit.

If the attempt to report the metrics to a local peer sensor unit fails, the sensor may store and queue the respective metrics for communication in a subsequent attempt at a subsequent reporting interval (block 834).

In embodiments, subsequent to any of blocks 834, 836 or 840, the inclination sensor(s) may be configured to deactivate themselves (or be deactivated by the system). The process them may return to block 810, where the inclination sensor(s) are activated or activate at an interval, and so on.

Figure 9:
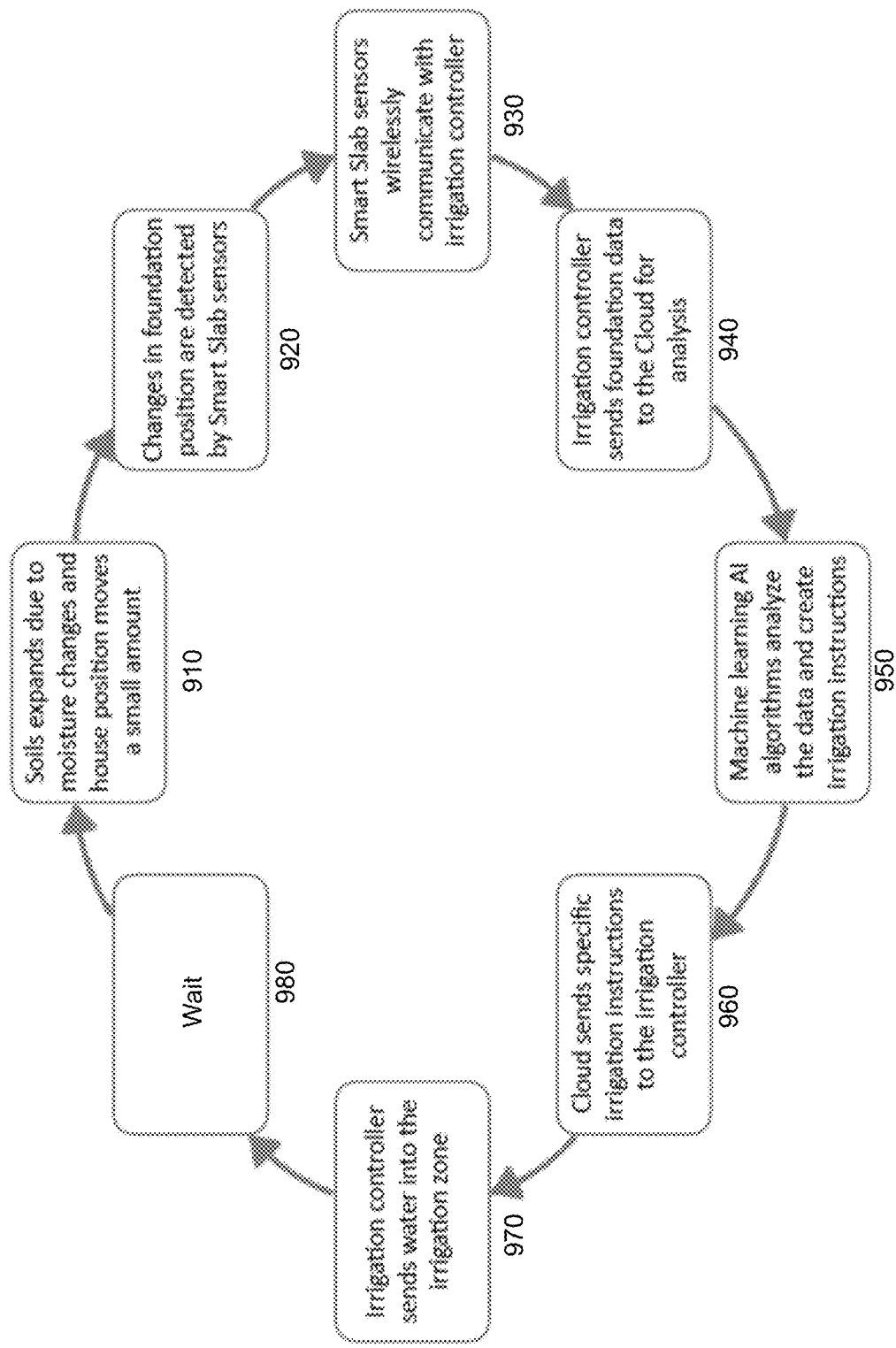
FIG. 9 is a state diagram of methods for monitoring structural foundations, alerting of potential failures or damage and controlling an irrigation system, according to some embodiments.
Figure 10:
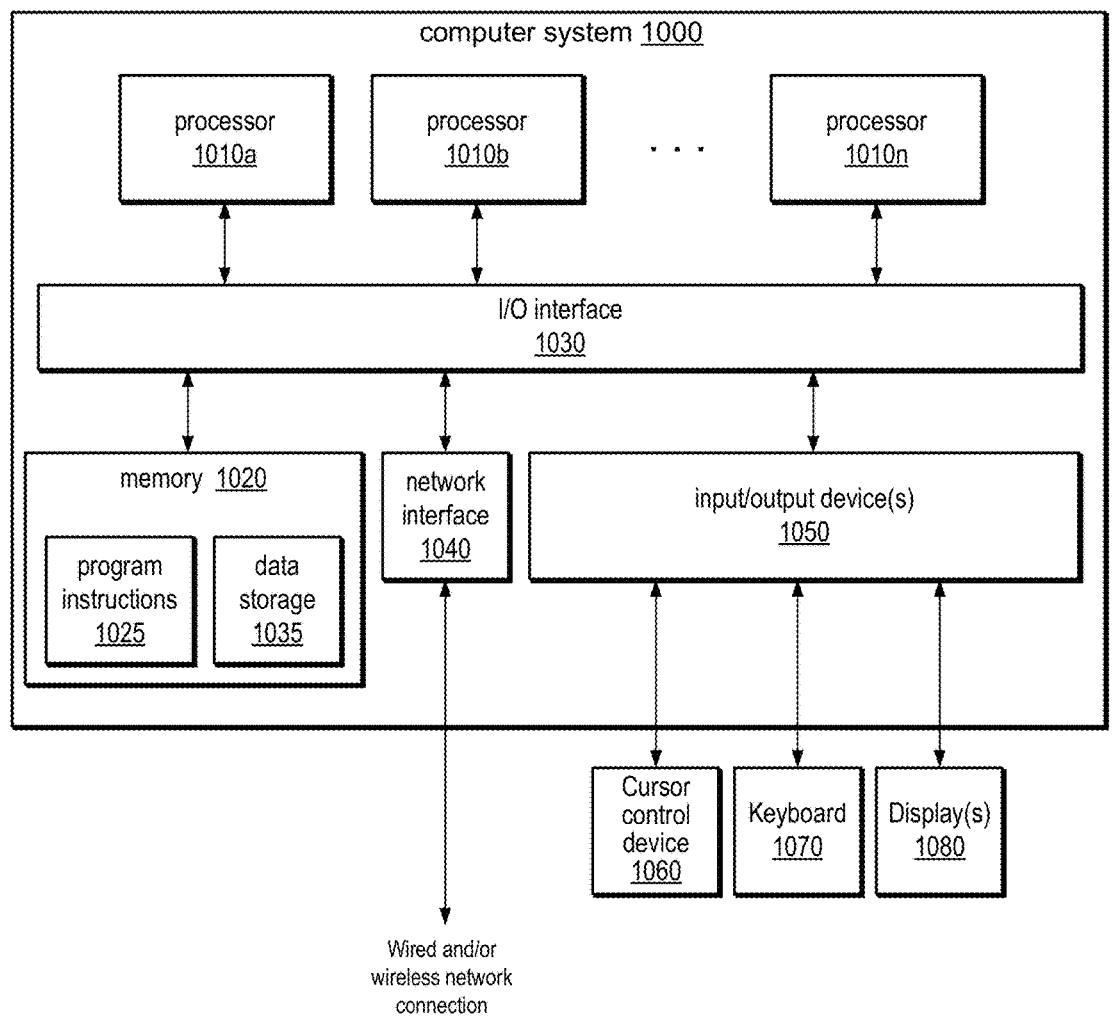
FIG. 10 illustrates an example computer system that may be used in embodiments.

FIG. 9 is a state diagram of methods for monitoring structural foundations, alerting of potential failures or damage and controlling an irrigation system, according to some embodiments. FIG. 9 is a flow diagram illustrating a process of monitoring movement of a structural foundation via a sensor system and mitigating problems associated with movement of a structural foundation via an irrigation system that is controlled by a control system.

As illustrated in block 910, soil expands (e.g., due to moisture changes) and the soil expansion causes the structural foundation of the house to move (e.g., small amounts). Such expansion may be especially destructive to a foundation when the soil expansion is experienced along one portion of the foundation, but not along other areas of the foundation. The uneven pressure caused by the expansion being different or limited in some areas, may cause damage to some types of foundations, for example. For instance, pressure from expansion on one side of a wall that is not experiencing pressure from expansion on the other side of the wall may push the wall away from the high pressure area toward the low pressure area. Correspondingly, soil may retract due to moisture changes (e.g., dry soil sometimes exhibits cracking from the lack of moisture). The expansion/retraction cycle may cause the foundation of the house to change position significantly over time, even when the movement associated with a single cycle may be small.

The changes in foundation position may be detected by sensors (block 920). For example, FIG. 8 illustrates a process for sensors to obtain changes in foundation position. In some embodiments, the sensors may communicate (e.g., wirelessly or wired communication) with a control unit. For instance, the control unit may be a sensor system control unit, or an irrigation system controller. In some embodiments the sensor system control unit may communicate (e.g., via wired or wireless communication) with an irrigation controller (block 930). In either case, the control unit (e.g., the sensor control unit or an irrigation controller) may send the foundation data (data that was obtained by the sensors) for analysis (block 940). For example, the sensor control unit may send the foundation data to a remote system for analysis (e.g., to a remote cloud-based data analysis system) or the irrigation controller may receive the data from the sensors and send the data to a remote system for analysis (e.g., to a remote cloud-based data analysis system). In some embodiments, the data analysis may be performed local to either of the control units.

In some of the embodiments, the analysis, whether performed local-to-the sensors or home, by one of the control units or on a remote system (e.g., in the cloud or by some other service provider) may include algorithms configured to analyze the data and create irrigation instructions (block 950). For example, machine learning and/or artificial intelligence algorithms may perform analysis of the data and create irrigation instructions.

As illustrated at 960, whichever entity performs the analysis and generates the irrigation instructions may also send the instructions to the irrigation controller. The irrigation controller may send water into irrigation zones, in accordance with the instructions, in embodiments. In some embodiments, the system may be programmed to wait a period of time before starting the process all over again (e.g., start over at 920). In some embodiments, the system may be configured to continuously monitor the foundation position. For example, the sensors may be provided with a constant source of power and may continually obtain and transmit metrics or data such as position, temperature, etc.

Example System

Embodiments of a control module for monitoring structural foundations, alerting of potential failures or damage and controlling an irrigation system and/or of the various monitoring structural foundations, alerting of potential failures or damage and controlling an irrigation system techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a control module for monitoring structural foundations, alerting of potential failures or damage and controlling an irrigation system are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a module for monitoring structural foundations, alerting of potential failures or damage and controlling an irrigation system as described herein, and data storage 1035, comprising various data accessible by program instructions 1025. In one embodiment, program instructions 1025 may include software elements of embodiments of a module for monitoring structural foundations, alerting of potential failures or damage and controlling an irrigation system as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a module for monitoring structural foundations, alerting of potential failures or damage and controlling an irrigation system as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. An apparatus for detecting a change in orientation of a building's structural foundation, the apparatus comprising:
   one or more energy storage units;
   three or more inclination sensors each:
      rigidly attached to respective portions of a building's structural foundation, and
      configured to measure inclination of the respective portion of the building's structural foundation, wherein measure inclination includes measure an orientation of the respective inclination sensor relative to a gravitational acceleration vector;
   one or more location reporting units;
   one or more wireless communication modules; and
   one or more processors configured to activate one of the one or more wireless communication modules at one or more intervals to report inclination of the building's structural foundation measured by one of the three or more inclination sensors.

2. The apparatus of claim 1, wherein:
   at least one of the one or more processors is configured to periodically activate a respective one of the wireless communication module at intervals such that the respective one of the wireless communication modules remains powered less than 2.0% of a period that the apparatus is in use.

3. The apparatus of claim 1, wherein:
   at least one of the one or more processors is configured to periodically activate a respective one of the inclination sensors at intervals such that the respective inclination sensor remains powered less than 0.2% of a period that the apparatus is in use.

4. The apparatus of claim 1, wherein at least one of the one or more energy storage units comprises:
   a solar cell array, and
   one or more capacitors connected to the solar cell array and configured to:
      store power received from the solar cell array, and
      deliver power to one or more components of the apparatus.

5. The apparatus of claim 1, further comprising:
   a temperature sensor configured to record a temperature adjacent to at least one of the three or more inclination sensors.

6. A method for detecting a change in an orientation of a building's structural foundation, the method comprising:
   measuring, by three or more inclination sensors, respective inclinations of respective portions of a building's structural foundation, wherein measuring a respective inclination of a respective portion of a building's structural foundation comprises measuring an orientation of a respective inclination sensor relative to a gravitational acceleration vector;
   periodically activating, at a pre-determined interval, respective wireless connections for each inclination sensor; and
   reporting, over respective periodically-activated wireless connections, respective orientations of respective ones of the three or more inclination sensors.

7. The method of claim 6, further comprising:
   de-activating at least one of the three or more inclination sensors at intervals such that the at least one inclination sensor remain powered less than 0.2% (2 tenths of one percent) or 2 1000ths of a period that an apparatus including the sensors is in use.

8. The method of claim 6, wherein the reporting further comprises:
   attempting to report the respective orientations of the three or more inclination sensors to a local master control unit over a short-range wireless network;
   responsive to an inability to report one or more respective orientations of one or more of the three or more inclination sensors to the local master control unit over the short-range wireless network, attempting to report a given one of the respective orientations to a local peer sensor unit; and
   responsive to an inability to report the given one of the respective orientations to the local peer sensor unit, storing and queuing the given respective orientation for communication in a subsequent attempt at a subsequent reporting interval.

9. The method of claim 6, further comprising:
   reporting location information of the three or more inclination sensors, wherein reporting location information comprises reporting a coordinate location on a fixed structure.

10. The method of claim 6, further comprising:
    reporting location information of the three or more inclination sensors, wherein reporting location information comprises reporting a GPS coordinate location.

11. The method of claim 6 further comprising:
    recording a temperature adjacent to one or more of the three or more inclination sensors; and
    reporting the temperature.

12. A system, comprising:
three or more sensor units each rigidly attached to respective portions of a building's structural foundation, each of the three or more sensor units configured to:
  periodically measure inclination of a respective portion of the structural foundation, wherein measure inclination includes measure an orientation of a respective inclination sensor relative to a gravitational acceleration vector,
  periodically activate, at a pre-determined interval, a wireless connection, and
  periodically report, to a data aggregator, the respective orientation of the respective inclination sensor relative to the gravitational acceleration vector; and
the data aggregator configured to:
  receive the respective orientations from each of the three or more inclination sensor units, and
  report data received from the one or more sensor units to a remote data repository.

13. The system of claim 12, further comprising:
an irrigation controller configured to control application of water to one or more specified irrigation zones adjacent to the foundation of the structure based upon commands received from a remote command authority, wherein to control application of water to the foundation of the structure based upon commands received from the remote command authority the irrigation controller is further configured to control application of respective specified amounts of water to each of the one or more specified irrigation zones adjacent to the foundation of the structure based upon the commands received from the remote command authority.

14. The system of claim 12, further comprising:
an irrigation controller configured to control application of water to a foundation of a structure based upon commands received from a remote command authority; and
a remote processing system configured to
  receive data from the one or more irrigation controllers;
  determine, based at least in part upon the data, respective specified amounts of water for each of one or more specified irrigation zones adjacent to the foundation of the structure; and
  generate irrigation controller commands for the control of the application of the respective specified amounts of water to the each of the one or more specified irrigation zones adjacent to the foundation of the structure.

15. The system of claim 14, wherein
to determine, based at least in part upon the data, respective specified amounts of water for each of one or more specified irrigation zones adjacent to the foundation of the structure the remote processing system is further configured to
  determine, based at least in part upon the data and a foundation topography survey, respective specified amounts of water for each of one or more specified irrigation zones adjacent to the foundation of the structure.

16. The system of claim 14, wherein
to determine, based at least in part upon the data, respective specified amounts of water for each of one or more specified irrigation zones adjacent to the foundation of the structure, the remote processing system is further configured to
  determine, based at least in part upon the data, historical feedback information related to results of previous commands, respective specified amounts of water for each of one or more specified irrigation zones adjacent to the foundation of the structure.

17. The apparatus of claim 1, wherein each of the inclination sensors and the processor are packed in watertight housings.

18. The apparatus of claim 1, wherein:
each of the inclination sensors:
  are located at respective corners of the structure; and
  are configured to measure the relative tilt at the respective corners of the structure.

19. The apparatus of claim 18, wherein:
the structure comprises a slab;
the three or more inclination sensors comprise four or more inclination sensors located at respective corners of the slab; and
each of the four or more inclination sensors are configured to measure respective tilt angles.

20. The apparatus of claim 1, wherein the one or more intervals at which the inclination of the structure is reported is determined based on memory usage.

21. The method recited in claim 6, wherein:
the three or more inclination sensors comprise four or more inclination sensors; and
said measuring the orientation of each of the one or more inclination sensors relative to a gravitational acceleration vector comprises measuring the orientation of each of the four or more inclination sensors relative to a gravitational acceleration vector.

* * * * *